US011658962B2

(12) United States Patent
Oberheide et al.

(10) Patent No.: US 11,658,962 B2
(45) Date of Patent: May 23, 2023

(54) SYSTEMS AND METHODS OF PUSH-BASED VERIFICATION OF A TRANSACTION

(71) Applicant: Duo Security, Inc., Ann Arbor, MI (US)

(72) Inventors: Jon Oberheide, Ann Arbor, MI (US); Adam Goodman, Ann Arbor, MI (US); Rich Smith, Ann Arbor, MI (US); Chris Czub, Ann Arbor, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 774 days.

(21) Appl. No.: 16/666,790

(22) Filed: Oct. 29, 2019

(65) Prior Publication Data

US 2020/0186520 A1 Jun. 11, 2020

Related U.S. Application Data

(60) Provisional application No. 62/776,641, filed on Dec. 7, 2018.

(51) Int. Cl.
*H04L 29/06* (2006.01)
*H04L 9/40* (2022.01)
(Continued)

(52) U.S. Cl.
CPC ....... *H04L 63/0838* (2013.01); *G06Q 20/322* (2013.01); *G06Q 20/382* (2013.01);
(Continued)

(58) Field of Classification Search
CPC ............... H04L 63/0838; H04L 63/105; H04L 2463/082; H04W 12/068; H04W 12/35; G06Q 20/322; G06Q 20/382; G06Q 20/40
(Continued)

(56) References Cited

U.S. PATENT DOCUMENTS 5,754,763 A 5/1998 Bereiter
5,838,792 A 11/1998 Ganesan
(Continued)

FOREIGN PATENT DOCUMENTS

EP 2639997 B1 9/2014
WO 2007075850 A2 7/2007
WO 2014150073 A2 9/2014

OTHER PUBLICATIONS

Aloul S Zahidi; et al. "Two factor authentication using mobile phones," 2009 IEEE/ACS International Conference on Computer Systems and Applications, Rabat, 2009, pp. 641-644., Feb. 6, 2018 00:00:00.0.

(Continued)

*Primary Examiner* — Evans Desrosiers (57) ABSTRACT

A system and method of implementing an API of an authentication service includes implementing a confirmation API, wherein the implementing includes: initiating a confirmation API request based on receiving an access request, wherein the confirmation API request operates to perform an authentication of a requestor making the access request; identifying the requestor based on a search of the requestor via the confirmation API; identifying, by one or more API endpoints of the remote authentication service: (i) a subscriber account of the subscriber maintained by the remote authentication service and (ii) identifying a user device of the requestor that is enrolled with the subscriber account based on the confirmation API request; transmitting a confirmation request to the user device; obtaining from the user device a response to the confirmation request and presenting the response to the confirmation request to the subscriber; and granting or denying the access request.

17 Claims, 3 Drawing Sheets

(51) Int. Cl.
  *G06Q 20/32* (2012.01)
  *G06Q 20/40* (2012.01)
  *G06Q 20/38* (2012.01)
  *H04W 12/30* (2021.01)
  *H04W 12/06* (2021.01)

(52) U.S. Cl.
  CPC .......... *G06Q 20/40* (2013.01); *H04L 63/105* (2013.01); *H04W 12/068* (2021.01); *H04W 12/35* (2021.01); *H04L 2463/082* (2013.01)

(58) Field of Classification Search
  USPC ......................................................... 726/17
  See application file for complete search history.

(56) References Cited

U.S. PATENT DOCUMENTS

| | | | |
|---|---|---|---|
| 5,870,723 | A | 2/1999 | Pare et al. |
| 6,119,096 | A | 9/2000 | Mann et al. |
| 6,209,091 | B1 | 3/2001 | Sudia et al. |
| 6,311,272 | B1 | 10/2001 | Gressel |
| 6,662,205 | B1 | 12/2003 | Bereiter |
| 6,694,025 | B1 | 2/2004 | Epstein et al. |
| 6,758,394 | B2 | 7/2004 | Maskatiya et al. |
| 6,823,359 | B1 | 11/2004 | Heidingsfeld et al. |
| 6,934,858 | B2 | 8/2005 | Woodhill |
| 6,956,950 | B2 | 10/2005 | Kausik |
| 6,990,591 | B1 | 1/2006 | Pearson |
| 6,996,716 | B1 | 2/2006 | Hsu |
| 7,000,247 | B2 | 2/2006 | Banzhof |
| 7,093,133 | B2 | 8/2006 | Hopkins et al. |
| 7,096,354 | B2 | 8/2006 | Wheeler et al. |
| 7,107,246 | B2 | 9/2006 | Wang |
| 7,146,009 | B2 | 12/2006 | Andivahis et al. |
| 7,172,115 | B2 | 2/2007 | Lauden |
| 7,213,260 | B2 | 5/2007 | Judge |
| 7,331,518 | B2 | 2/2008 | Rable |
| 7,334,255 | B2 | 2/2008 | Lin et al. |
| 7,340,600 | B1 | 3/2008 | Corella |
| 7,386,720 | B2 | 6/2008 | Sandhu et al. |
| 7,447,784 | B2 | 11/2008 | Eun |
| 7,463,637 | B2 | 12/2008 | Bou-Diab et al. |
| 7,483,384 | B2 | 1/2009 | Bryant et al. |
| 7,496,662 | B1 | 2/2009 | Roesch et al. |
| 7,526,792 | B2 | 4/2009 | Ross |
| 7,562,382 | B2 | 7/2009 | Hinton et al. |
| 7,562,385 | B2 | 7/2009 | Thione et al. |
| 7,571,471 | B2 | 8/2009 | Sandhu et al. |
| 7,574,733 | B2 | 8/2009 | Woodhill |
| 7,599,493 | B2 | 10/2009 | Sandhu et al. |
| 7,630,493 | B2 | 12/2009 | Sandhu et al. |
| 7,711,122 | B2 | 5/2010 | Allen et al. |
| 7,712,137 | B2 | 5/2010 | Meier |
| 7,716,240 | B2 | 5/2010 | Lim |
| 7,764,970 | B2 | 7/2010 | Neil et al. |
| 7,793,110 | B2 | 9/2010 | Durfee et al. |
| 7,836,501 | B2 | 11/2010 | Sobel et al. |
| 7,904,608 | B2 | 3/2011 | Price |
| 7,953,979 | B2 | 5/2011 | Borneman et al. |
| 7,958,362 | B2 | 6/2011 | Hwang |
| 7,961,645 | B2 | 6/2011 | Gudipudi et al. |
| 7,982,595 | B2 | 7/2011 | Hanna et al. |
| 7,983,987 | B2 | 7/2011 | Kranzley et al. |
| 8,001,610 | B1 | 8/2011 | Chickering et al. |
| 8,010,779 | B2 | 8/2011 | Sermersheim et al. |
| 8,028,329 | B2 | 9/2011 | Whitcomb |
| 8,099,368 | B2 | 1/2012 | Coulter et al. |
| 8,108,933 | B2 | 1/2012 | Mahaffey |
| 8,136,148 | B1 | 3/2012 | Chayanam et al. |
| 8,141,146 | B2 | 3/2012 | Ozeki |
| 8,151,333 | B2 | 4/2012 | Zhu et al. |
| 8,161,527 | B2 | 4/2012 | Curren |
| 8,185,744 | B2 | 5/2012 | Brown et al. |
| 8,200,980 | B1 | 6/2012 | Robinson et al. |
| 8,225,392 | B2 | 7/2012 | Dubrovsky et al. |
| 8,245,044 | B2 | 8/2012 | Kang |
| 8,259,947 | B2 | 9/2012 | Gantman et al. |
| 8,332,627 | B1 | 12/2012 | Matthews et al. |
| 8,335,933 | B2 | 12/2012 | Humphrey et al. |
| 8,340,287 | B2 | 12/2012 | Sandhu et al. |
| 8,340,635 | B2 | 12/2012 | Herz et al. |
| 8,380,192 | B2 | 2/2013 | Kim et al. |
| 8,397,301 | B2 | 3/2013 | Hering et al. |
| 8,397,302 | B2 | 3/2013 | Mont et al. |
| 8,402,526 | B2 | 3/2013 | Ahn |
| 8,418,168 | B2 | 4/2013 | Tyhurst et al. |
| 8,458,798 | B2 | 6/2013 | Williams et al. |
| 8,484,708 | B2 | 7/2013 | Chern |
| 8,495,720 | B2 | 7/2013 | Counterman |
| 8,499,149 | B2 | 7/2013 | Chen |
| 8,499,339 | B2 | 7/2013 | Chao et al. |
| 8,510,820 | B2 | 8/2013 | Oberheide et al. |
| 8,522,010 | B2 | 8/2013 | Ozzie et al. |
| 8,528,039 | B2 | 9/2013 | Chakarapani |
| 8,533,844 | B2 | 9/2013 | Mahaffey et al. |
| 8,538,028 | B2 | 9/2013 | Goeller et al. |
| 8,539,544 | B2 | 9/2013 | Srinivasan et al. |
| 8,539,567 | B1 | 9/2013 | Luxemberg et al. |
| 8,548,426 | B2 | 10/2013 | Smith |
| 8,549,601 | B2 | 10/2013 | Ganesan |
| 8,571,220 | B2 | 10/2013 | Ollikainen et al. |
| 8,578,162 | B2 | 11/2013 | Jentzsch et al. |
| 8,588,422 | B2 | 11/2013 | Beachem et al. |
| 8,595,809 | B2 | 11/2013 | Chayanam et al. |
| 8,595,822 | B2 | 11/2013 | Schrecker et al. |
| 8,601,554 | B2 | 12/2013 | Gordon et al. |
| 8,612,305 | B2 | 12/2013 | Dominguez et al. |
| 8,627,438 | B1 | 1/2014 | Bhimanaik |
| 8,646,060 | B1 | 2/2014 | Ben Ayed |
| 8,646,086 | B2 | 2/2014 | Chakra et al. |
| 8,667,288 | B2 | 3/2014 | Yavuz |
| 8,689,287 | B2 | 4/2014 | Bohmer et al. |
| 8,700,729 | B2 | 4/2014 | Dua |
| 8,707,365 | B2 | 4/2014 | Corl |
| 8,707,384 | B2 | 4/2014 | Jain et al. |
| 8,713,329 | B2 | 4/2014 | Schneider |
| 8,713,639 | B2 | 4/2014 | Cheeniyil et al. |
| 8,719,930 | B2 | 5/2014 | Lapsley et al. |
| 8,732,475 | B2 | 5/2014 | Fahrny et al. |
| 8,732,839 | B2 | 5/2014 | Hohl |
| 8,737,623 | B2 | 5/2014 | Hart |
| 8,745,703 | B2 | 6/2014 | Lambert et al. |
| 8,751,801 | B2 | 6/2014 | Harris et al. |
| 8,756,651 | B2 | 6/2014 | Baer et al. |
| 8,756,698 | B2 | 6/2014 | Sidagni |
| 8,763,077 | B2 | 6/2014 | Oberheide et al. |
| 8,806,609 | B2 | 8/2014 | Gladstone et al. |
| 8,806,638 | B1 | 8/2014 | Mani |
| 8,838,759 | B1 | 9/2014 | Eatough et al. |
| 8,850,017 | B2 | 9/2014 | Ebrahimi et al. |
| 8,850,516 | B1 | 9/2014 | Hrebicek et al. |
| 8,850,530 | B2 | 9/2014 | Shahbazi |
| 8,862,097 | B2 | 10/2014 | Brand et al. |
| 8,891,772 | B2 | 11/2014 | D'Souza et al. |
| 8,893,230 | B2 | 11/2014 | Oberheide et al. |
| 8,898,762 | B2 | 11/2014 | Kang |
| 8,903,365 | B2 | 12/2014 | Stricklen et al. |
| 8,935,769 | B2 | 1/2015 | Hessler |
| 8,938,531 | B1 | 1/2015 | Cotton et al. |
| 8,938,799 | B2 | 1/2015 | Kuo |
| 8,949,596 | B2 | 2/2015 | Yin et al. |
| 8,949,927 | B2 | 2/2015 | Arnott et al. |
| 8,955,038 | B2 | 2/2015 | Nicodemus et al. |
| 8,955,075 | B2 | 2/2015 | Von Bokern et al. |
| 8,966,587 | B2 | 2/2015 | Nair et al. |
| 8,984,276 | B2 | 3/2015 | Benson et al. |
| 9,037,127 | B2 | 5/2015 | Raleigh |
| 9,043,886 | B2 | 5/2015 | Srinivasan et al. |
| 9,049,011 | B1 | 6/2015 | Agrawal |
| 9,049,594 | B2 | 6/2015 | Chen et al. |
| 9,071,611 | B2 | 6/2015 | Yadav et al. |
| 9,076,343 | B2 | 7/2015 | Chaar et al. |
| 9,077,758 | B1 | 7/2015 | McGovern et al. |
| 9,110,754 | B2 | 8/2015 | Poonamalli et al. |

(56) References Cited

U.S. PATENT DOCUMENTS

| | | |
|---|---|---|
| 9,118,656 B2 | 8/2015 | Ting et al. |
| 9,122,888 B2 | 9/2015 | Devi |
| 9,124,582 B2 | 9/2015 | Kalinichenko et al. |
| 9,135,458 B1 | 9/2015 | Hankins et al. |
| 9,154,387 B2 | 10/2015 | Maki et al. |
| 9,172,545 B2 | 10/2015 | Edstrom et al. |
| 9,189,491 B2 | 11/2015 | Fushman et al. |
| 9,201,644 B2 | 12/2015 | Klein et al. |
| 9,203,841 B2 | 12/2015 | Neuman et al. |
| 9,223,961 B1 | 12/2015 | Sokolov |
| 9,225,840 B2 | 12/2015 | Malatack et al. |
| 9,253,185 B2 | 2/2016 | Alaranta et al. |
| 9,258,296 B2 | 2/2016 | Juthani |
| 9,270,674 B2 | 2/2016 | Lang et al. |
| 9,282,085 B2 | 3/2016 | Oberheide et al. |
| 9,338,156 B2 | 5/2016 | Oberheide et al. |
| 9,338,163 B2 | 5/2016 | Wendling et al. |
| 9,344,275 B2 | 5/2016 | Bar-El et al. |
| 9,374,654 B2 | 6/2016 | Lindeman et al. |
| 9,386,003 B2 | 7/2016 | Kumar |
| 9,391,980 B1 | 7/2016 | Krahn et al. |
| 9,397,892 B2 | 7/2016 | Kirner et al. |
| 9,430,938 B2 | 8/2016 | Proud |
| 9,443,073 B2 | 9/2016 | Oberheide et al. |
| 9,443,084 B2 | 9/2016 | Nice et al. |
| 9,454,365 B2 | 9/2016 | Oberheide et al. |
| 9,467,463 B2 | 10/2016 | Oberheide et al. |
| 9,479,509 B2 | 10/2016 | Zeuthen |
| 9,501,315 B2 | 11/2016 | Desai et al. |
| 9,544,143 B2 | 1/2017 | Oberheide et al. |
| 9,607,155 B2 | 3/2017 | Beresnevichiene et al. |
| 9,659,160 B2 | 5/2017 | Ligatti et al. |
| 9,680,864 B2 | 6/2017 | Khesin |
| 9,706,410 B2 | 7/2017 | Sreenivas et al. |
| 9,723,019 B1 | 8/2017 | Rathor |
| 9,754,097 B2 | 9/2017 | Hessler |
| 9,762,429 B2 | 9/2017 | Elmaliah |
| 9,769,538 B2 | 9/2017 | Killick |
| 9,832,221 B1 | 11/2017 | Newstadt et al. |
| 9,918,226 B2 | 3/2018 | Khan |
| 9,940,119 B2 | 4/2018 | Brownell et al. |
| 9,996,343 B2 | 6/2018 | Oberheide et al. |
| 2002/0013898 A1 | 1/2002 | Sudia et al. |
| 2002/0091745 A1 | 7/2002 | Ramamurthy et al. |
| 2002/0123967 A1 | 9/2002 | Wang |
| 2002/0131404 A1 | 9/2002 | Mehta et al. |
| 2002/0136410 A1 | 9/2002 | Hanna |
| 2003/0011545 A1 | 1/2003 | Sagano et al. |
| 2003/0012093 A1 | 1/2003 | Tada et al. |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2003/0149781 A1 | 8/2003 | Yared et al. |
| 2003/0172291 A1 | 9/2003 | Judge et al. |
| 2004/0064706 A1 | 4/2004 | Lin et al. |
| 2004/0139318 A1 | 7/2004 | Fiala et al. |
| 2004/0187018 A1 | 9/2004 | Owen et al. |
| 2004/0215672 A1 | 10/2004 | Pfitzner |
| 2004/0218763 A1 | 11/2004 | Gantman et al. |
| 2005/0024052 A1 | 2/2005 | Bendall et al. |
| 2005/0097350 A1 | 5/2005 | Patrick et al. |
| 2005/0097352 A1 | 5/2005 | Patrick et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2005/0268326 A1 | 12/2005 | Bhargavan et al. |
| 2006/0021018 A1 | 1/2006 | Hinton et al. |
| 2006/0024269 A1 | 2/2006 | Doyle et al. |
| 2006/0026304 A1 | 2/2006 | Price |
| 2006/0031938 A1 | 2/2006 | Choi |
| 2006/0059569 A1 | 3/2006 | Dasgupta et al. |
| 2006/0075475 A1 | 4/2006 | Boulos et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184787 A1 | 8/2006 | Sandhu et al. |
| 2006/0184788 A1 | 8/2006 | Sandhu et al. |
| 2006/0242692 A1 | 10/2006 | Thione et al. |
| 2007/0016948 A1 | 1/2007 | Dubrovsky et al. |
| 2007/0027961 A1 | 2/2007 | Holzer |
| 2007/0033148 A1 | 2/2007 | Cahill |
| 2007/0081667 A1 | 4/2007 | Hwang |
| 2007/0101145 A1 | 5/2007 | Sachdeva et al. |
| 2007/0143860 A1 | 6/2007 | Hardt |
| 2007/0156592 A1 | 7/2007 | Henderson |
| 2007/0156659 A1 | 7/2007 | Lim |
| 2007/0185978 A1 | 8/2007 | Montulli |
| 2007/0186106 A1 | 8/2007 | Ting et al. |
| 2007/0199060 A1 | 8/2007 | Touboul |
| 2007/0204016 A1 | 8/2007 | Kunz et al. |
| 2007/0228148 A1 | 10/2007 | Rable |
| 2007/0250914 A1 | 10/2007 | Fazal et al. |
| 2007/0254631 A1 | 11/2007 | Spooner |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0004964 A1 | 1/2008 | Messa et al. |
| 2008/0010665 A1 | 1/2008 | Hinton et al. |
| 2008/0012041 A1 | 1/2008 | Kesler |
| 2008/0034413 A1 | 2/2008 | He et al. |
| 2008/0049642 A1 | 2/2008 | Gudipudi et al. |
| 2008/0059804 A1 | 3/2008 | Shah et al. |
| 2008/0069347 A1 | 3/2008 | Brown et al. |
| 2008/0120411 A1 | 5/2008 | Eberle |
| 2008/0134311 A1 | 6/2008 | Medvinsky et al. |
| 2008/0201186 A1 | 8/2008 | Poon et al. |
| 2008/0229104 A1 | 9/2008 | Ju et al. |
| 2008/0301669 A1 | 12/2008 | Rao et al. |
| 2009/0055906 A1 | 2/2009 | Von |
| 2009/0077060 A1 | 3/2009 | Sermersheim et al. |
| 2009/0083225 A1 | 3/2009 | Jacobs et al. |
| 2009/0167489 A1 | 7/2009 | Nan et al. |
| 2009/0187986 A1 | 7/2009 | Ozeki |
| 2009/0198997 A1 | 8/2009 | Yeap et al. |
| 2009/0210705 A1 | 8/2009 | Chen |
| 2009/0254978 A1 | 10/2009 | Rouskov et al. |
| 2009/0259848 A1 | 10/2009 | Williams et al. |
| 2009/0271863 A1 | 10/2009 | Govindavajhala et al. |
| 2009/0300596 A1 | 12/2009 | Tyhurst et al. |
| 2009/0300707 A1 | 12/2009 | Garimella et al. |
| 2009/0328178 A1 | 12/2009 | McDaniel et al. |
| 2010/0002378 A1 | 1/2010 | Chen et al. |
| 2010/0011433 A1 | 1/2010 | Harrison et al. |
| 2010/0018000 A1 | 1/2010 | Hsu |
| 2010/0023781 A1 | 1/2010 | Nakamoto |
| 2010/0026302 A1 | 2/2010 | Doty et al. |
| 2010/0036931 A1 | 2/2010 | Certain et al. |
| 2010/0042954 A1 | 2/2010 | Rosenblatt et al. |
| 2010/0069104 A1 | 3/2010 | Neil et al. |
| 2010/0100725 A1 | 4/2010 | Ozzie et al. |
| 2010/0100924 A1 | 4/2010 | Hinton |
| 2010/0107225 A1 | 4/2010 | Spencer et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0131755 A1 | 5/2010 | Zhu et al. |
| 2010/0180001 A1 | 7/2010 | Hardt |
| 2010/0186082 A1 | 7/2010 | Ladki et al. |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0274859 A1 | 10/2010 | Bucuk |
| 2010/0319068 A1 | 12/2010 | Abbadessa et al. |
| 2010/0330969 A1 | 12/2010 | Kim et al. |
| 2011/0026716 A1 | 2/2011 | Tang et al. |
| 2011/0055903 A1 | 3/2011 | Leggette |
| 2011/0086616 A1 | 4/2011 | Brand et al. |

(56) References Cited

U.S. PATENT DOCUMENTS

| | | |
|---|---|---|
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1 | 6/2011 | Ye et al. |
| 2011/0145900 A1 | 6/2011 | Chern |
| 2011/0179472 A1 | 7/2011 | Ganesan |
| 2011/0197266 A1 | 8/2011 | Chu et al. |
| 2011/0197267 A1 | 8/2011 | Gravel et al. |
| 2011/0219449 A1 | 9/2011 | St et al. |
| 2011/0225637 A1 | 9/2011 | Counterman |
| 2011/0231265 A1 | 9/2011 | Brown et al. |
| 2011/0277025 A1 | 11/2011 | Counterman |
| 2011/0282908 A1 | 11/2011 | Fly et al. |
| 2011/0302410 A1 | 12/2011 | Clarke et al. |
| 2011/0302630 A1 | 12/2011 | Nair et al. |
| 2012/0029084 A1 | 2/2012 | Wong |
| 2012/0030093 A1 | 2/2012 | Farias |
| 2012/0060360 A1 | 3/2012 | Liu |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0117229 A1 | 5/2012 | Van et al. |
| 2012/0117626 A1 | 5/2012 | Yates et al. |
| 2012/0151567 A1 | 6/2012 | Chayanam et al. |
| 2012/0159600 A1 | 6/2012 | Takagi |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0254957 A1 | 10/2012 | Fork et al. |
| 2012/0278454 A1 | 11/2012 | Stewart et al. |
| 2012/0290841 A1 | 11/2012 | Jentzsch |
| 2012/0300931 A1 | 11/2012 | Ollikainen et al. |
| 2012/0317287 A1 | 12/2012 | Amitai et al. |
| 2012/0321086 A1 | 12/2012 | D'Souza et al. |
| 2013/0004200 A1 | 1/2013 | Okabe |
| 2013/0008110 A1 | 1/2013 | Rothwell |
| 2013/0012429 A1 | 1/2013 | Eddowes et al. |
| 2013/0017968 A1 | 1/2013 | Gurtner et al. |
| 2013/0024628 A1 | 1/2013 | Benhase et al. |
| 2013/0042002 A1 | 2/2013 | Cheeniyil et al. |
| 2013/0055233 A1 | 2/2013 | Hatton et al. |
| 2013/0055247 A1 | 2/2013 | Hiltgen et al. |
| 2013/0060708 A1 | 3/2013 | Oskolkov et al. |
| 2013/0067538 A1 | 3/2013 | Dharmarajan et al. |
| 2013/0074061 A1 | 3/2013 | Averbuch et al. |
| 2013/0074601 A1 | 3/2013 | Jackson |
| 2013/0081101 A1 | 3/2013 | Baer et al. |
| 2013/0086210 A1 | 4/2013 | Yiu et al. |
| 2013/0086658 A1 | 4/2013 | Kottahachchi et al. |
| 2013/0091544 A1 | 4/2013 | Oberheide et al. |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0263211 A1 | 10/2013 | Neuman et al. |
| 2013/0276142 A1 | 10/2013 | Peddada |
| 2013/0310006 A1 | 11/2013 | Chen et al. |
| 2013/0311776 A1 | 11/2013 | Besehanic |
| 2013/0326224 A1 | 12/2013 | Yavuz |
| 2013/0326493 A1 | 12/2013 | Poonamalli et al. |
| 2014/0001975 A1 | 1/2014 | Lee et al. |
| 2014/0019752 A1 | 1/2014 | Yin et al. |
| 2014/0020051 A1 | 1/2014 | Lu et al. |
| 2014/0020184 A1 | 1/2014 | Loth |
| 2014/0047546 A1 | 2/2014 | Sidagni |
| 2014/0181517 A1 | 6/2014 | Alaranta et al. |
| 2014/0181520 A1 | 6/2014 | Wendling et al. |
| 2014/0188796 A1 | 7/2014 | Fushman et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1* | 8/2014 | Oberheide ............ G06F 21/40 726/4 |
| 2014/0247140 A1 | 9/2014 | Proud |
| 2014/0297840 A1 | 10/2014 | Qureshi |
| 2014/0310415 A1 | 10/2014 | Kirner et al. |
| 2014/0351954 A1 | 11/2014 | Brownell et al. |
| 2014/0376543 A1 | 12/2014 | Malatack et al. |
| 2015/0002646 A1 | 1/2015 | Namii |
| 2015/0012914 A1 | 1/2015 | Klein et al. |
| 2015/0026461 A1 | 1/2015 | Devi |
| 2015/0172321 A1 | 6/2015 | Kirti et al. |
| 2015/0213268 A1 | 7/2015 | Nance et al. |
| 2015/0237026 A1 | 8/2015 | Kumar |
| 2015/0242643 A1 | 8/2015 | Hankins et al. |
| 2015/0312233 A1 | 10/2015 | Graham et al. |
| 2015/0381662 A1 | 12/2015 | Nair et al. |
| 2016/0005696 A1 | 1/2016 | Tomohiro |
| 2016/0018007 A1 | 1/2016 | Eckholz |
| 2016/0021117 A1 | 1/2016 | Harmon et al. |
| 2016/0028639 A1 | 1/2016 | Wong et al. |
| 2016/0030023 A1 | 2/2016 | Hayakawa et al. |
| 2016/0056962 A1 | 2/2016 | Mehtälä |
| 2016/0080366 A1 | 3/2016 | Agarwal |
| 2016/0099963 A1 | 4/2016 | Mahaffey et al. |
| 2016/0164866 A1 | 6/2016 | Oberheide et al. |
| 2016/0180072 A1 | 6/2016 | Ligatti et al. |
| 2016/0180343 A1 | 6/2016 | Poon et al. |
| 2016/0212129 A1 | 7/2016 | Johnston et al. |
| 2016/0286391 A1 | 9/2016 | Khan |
| 2016/0300231 A1 | 10/2016 | Shavell et al. |
| 2016/0366589 A1 | 12/2016 | Jean |
| 2017/0039242 A1 | 2/2017 | Milton et al. |
| 2017/0169066 A1 | 6/2017 | Mantri et al. |
| 2017/0214701 A1 | 7/2017 | Hasan |
| 2018/0027006 A1 | 1/2018 | Zimmermann et al. |
| 2018/0205726 A1 | 7/2018 | Chari et al. |
| 2019/0334921 A1* | 10/2019 | Pattar ................... H04L 9/3271 |

OTHER PUBLICATIONS

Bonneau Joseph; et al. "Passwords and the evolution of imperfect authentication." Communications of the ACM 58.7 (2015): 78-87., Feb. 6, 2018 00:00:00.0.

Edge, Kenneth, et al. "The use of attack and protection trees to analyze security for an online banking system." System Sciences, 2007. HICSS 2007. 40th Annual Hawaii International Conference on. IEEE, 2007.

Goldfeder et al., Securing Bitcoin wallets via a new DSA/ECDSA threshold signature scheme, http://www.cs.princeton.edu/~stevenag/threshold_sigs.pdf.

Kher Vishal; et al. "Securing distributed storage: challenges, techniques and systems." Proceedings of the 2005 ACM workshop on Storage security and survivability. ACM, 2005, pp. 9-25., Feb. 6, 2018 00:00:00.0.

Neuenhofen, Kay, and Mathew Thompson. "A secure marketplace for mobile java agents." Proceeding of the second international Conference on Autonomous agents. ACM, 1998. (pp. 212-218).

Simske et al., "APEX: Automated Policy Enforcement exchange", Sep. 21-24, 2010, ACM, pp. 139-142.

"Symantec, Administration guide for Symantec Endpoint protection and Symantec network access control, 2009, version 11.00.05.00.00".

"Symantec, Administration Guide for Symantec TM Endpoint Protection and Symantec Network Access Control, Aug. 1, 2007".

* cited by examiner

100

```
Registering an Authority Device with an Authentication Service
S110
```

Identifying a Request for a Transaction S120

Implementing a Confirmation API of the Auth Service S130

Messaging the Enrolled Authority Device S140

Confirming or Denying the Request for the Transaction S150

Communication a Confirmed Transaction S160

Communication a Denied Transaction S162

SYSTEMS AND METHODS OF PUSH-BASED VERIFICATION OF A TRANSACTION

CROSS-REFERENCE TO RELATED APPLICATIONS

This application claims the benefit of U.S. Provisional Application No. 62/776,641 filed 7 Dec. 2018, which is incorporated in its entirety by this reference.

TECHNICAL FIELD

This invention relates generally to the digital security services field, and more specifically to a new and useful system and method of notifying mobile devices to complete transactions in the digital security field.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). However, many of these solutions are burdensome to users, requiring the user to remember information or carry extra devices to complete a transaction.

Recent innovations in the digital security space has provided authentication and/or verification solutions that overcome the deficiencies of the above-mentioned problems by enabling push-based authentication to mobile communication devices and the like, as described in the prior applications that are related to the instant application. While the push-based authentication as implemented in modern security applications may typically be used to authenticate and/or authorize a user typically at login or at an access point, there is no current solution for authenticating and/or confirming authorization of ad-hoc requests from internal users of an enterprise for performing a sensitive operation or the like. This deficiency is equally apparent with customers and/or external users to the enterprise.

Thus, there is a need in the digital security services field to create a new and useful system and method of verifying internal users and/or external users of an enterprise via an out-of-band technique, such as by notifying mobile devices to complete or confirm a request for a transaction or the like. The one or more inventions described herein below provide such new and useful systems and methods.

BRIEF SUMMARY OF THE INVENTION(S)

In one embodiment, a method for implementing an application programming interface for multi-factor authentication service includes at a subscriber entity: receiving, from a requestor, an access request to one or more services or to one or more resources of the subscriber entity, wherein the subscriber entity relates to an entity having a subscriber account with a remote security service, wherein the subscriber account subscribes the subscriber entity to one or more security services of the remote security service; transmitting a user validation request via a validation application programming interface (API) of the remote security service based on the access request; at the validation API of the remote security service: identifying: (i) the subscriber account of the subscriber entity and (ii) an enrolled user device of a user enrolled with the subscriber account based on the user validation request; identifying an authentication scheme from a plurality of distinct authentication schemes based on the user validation request; transmitting to the enrolled user device an authentication request based on the authentication scheme; collecting from the enrolled user device a response to the authentication request and presenting a validation response to the authentication request to the subscriber entity based on the response; and granting or denying the access request of the requestor based on the validation response from the validation API of the remote security service.

In one embodiment, transmitting the user validation request includes selecting by the subscriber entity the authentication scheme via the validation API, wherein the authentication scheme indicates one distinct authentication method selected from a plurality of distinct authentication methods for authenticating the requestor.

In one embodiment, the enrolled user device of the user includes a security application of the remote security service installed locally on the enrolled user device of the user, and the authentication scheme includes pushing the authentication request, via the API, to the security application of the enrolled user device of the user.

In one embodiment, the authentication scheme includes transmitting from the API the authentication request in a short message service message to the enrolled user device of the user.

In one embodiment, the authentication scheme includes (a) generating a one-time password (OTP) by the API and transmitting from the API the authentication request comprising the OTP to the enrolled user device of the user.

In one embodiment, the authentication scheme includes (a) generating a universal second factor (U2F) token by the API and transmitting from the API the authentication request comprising the U2F token to the enrolled user device of the user.

In one embodiment, the method includes at the subscriber entity: identifying the requestor via the validation API, wherein the identifying includes: searching the requestor via the validation API based on identification data of the requestor, and selecting the requestor from search results of the validation API, wherein transmitting the user validation request via the validation API is based on the selection of the requestor.

In one embodiment, the authentication service maintains a list of users having one or more enrolled user devices with the subscriber account, and the list of users is exposed via the validation API based on an initiation of the user validation request by the subscriber entity.

In one embodiment, the authentication service maintains a list of users having one or more enrolled user devices with the subscriber account, and the list of users is exposed via the validation application programming interface based on the searching the requestor via the validation API.

In one embodiment, presenting the validation response to the authentication request to the subscribing entity includes presenting the validation response via the validation API, the validation response indicating a successful authentication or an unsuccessful authentication of the user.

In one embodiment, the requestor relates to an internal requestor that includes an agent of the subscriber entity.

In one embodiment, the requestor relates to an external requestor that includes a non-agent of the subscriber entity, and the external requestor enrolls a user device to the subscriber account at the remote security service based on scanning with the user device a computer-readable code that automatically enrolls the user device that scans the computer-readable code to the subscriber account.

In one embodiment, the method includes at the subscriber entity: implementing a web-based interface that exposes the validation API of the remote security service.

In one embodiment, the remote security service is implemented by a distributed network of computers including the validation API.

In one embodiment, the validation response comprises an indication computed by the remote security service indicating that a validation of the requestor is successful based on the response to the authentication request.

In one embodiment, the validation response comprises an indication computed by the remote security service indicating that a validation of the requestor is unsuccessful based on the response to the authentication request.

In one embodiment, a method of implementing an application programming interface of an authentication service for authenticating internal users or external users to a subscriber of the authentication service includes implementing confirmation application programming interface (API) that is in operable communication with API endpoints of a remote authentication service, wherein the implementing includes: initiating a confirmation API request based on receiving an access request at a subscriber to the remote authentication service, wherein the confirmation API request operates to perform an authentication of a requestor making the access request; identifying the requestor based on a search of the requestor via the confirmation API; identifying, by one or more API endpoints of the remote authentication service: (i) a subscriber account of the subscriber maintained by the remote authentication service and (ii) identifying a user device of the requestor that is enrolled with the subscriber account based on the confirmation API request; transmitting a confirmation request, by the one or more API endpoints of the remote authentication service, to the user device that is enrolled with the subscriber account; obtaining from the user device a response to the confirmation request and presenting the response to the confirmation request to the subscriber; and granting or denying the access request based on the response from the confirmation API of the remote authentication service.

In one embodiment, the method includes at the subscriber entity: identifying the requestor via the validation API, wherein the identifying includes: searching the requestor via the validation API based on identification data of the requestor, and selecting the requestor from search results of the validation API, wherein transmitting the user validation request via the validation API is based on the selection of the requestor.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Authorizing and/or Confirming an Internal/External Transaction

Figure 1:
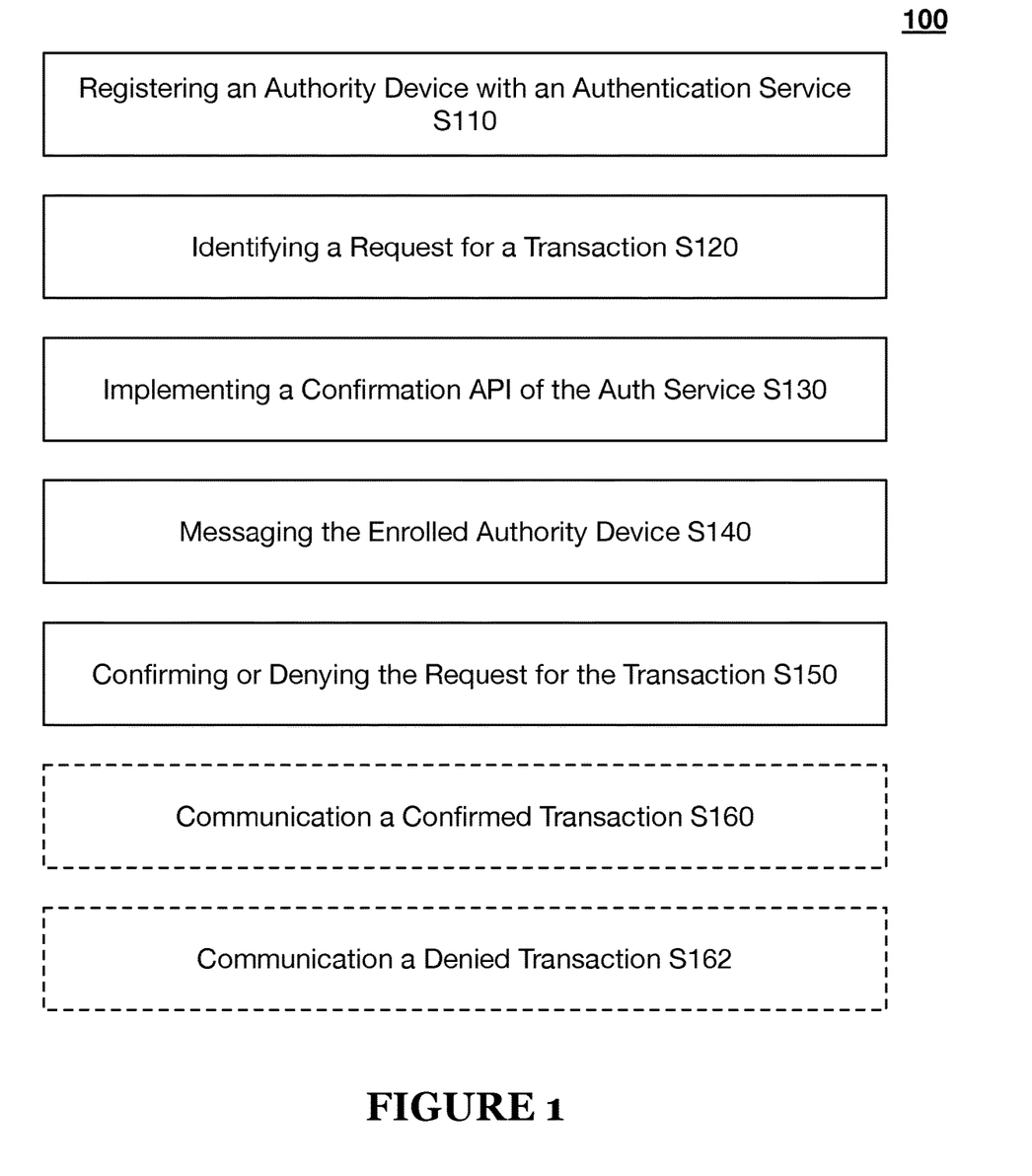
FIG. 1 illustrates an example method in accordance with one or more embodiments of the present application.

As shown in FIG. 1, a method 100 for authorizing and/or confirming a remote transaction via a messaging-based notification in a mobile communication device. The method 100 preferably includes registering and/or enrolling a mobile communication device of a subscriber for an account with an online authentication service S110, identifying a request for a transaction by an agent of an entity subscribed to the authentication service S120, implementing a confirmation API S130, messaging the enrolled mobile communication device with transaction request data S140, confirming or denying the request for the transaction based on a response or non-response to the messaging S150.

Generally, the method 100 functions to use push-based challenges on mobile communication device for the authentication and/or authorization of parties involved in a transaction. The method 100 functions to utilize non-intrusive techniques while providing improved security. The pushed messages preferably alert a user to the transaction request in real-time such that a decision of confirmation or denial of a transaction can be communicated to a requesting party with minimal time lag (e.g., preferably less than a minute, and more preferably less than 10 seconds). The method may be employed as standalone transaction validation or incorporated into a multifactor system. The method may be used in application such as web-based applications, remote access credentials, privileged account management, financial transactions, password recovery/reset mechanisms, physical access control, Automatic Teller Machine (ATM) withdrawals, domain name transfers, online or offline transactions, building access security, internal enterprise or any suitable application requiring authentication and/or authorization.

Figure 2:
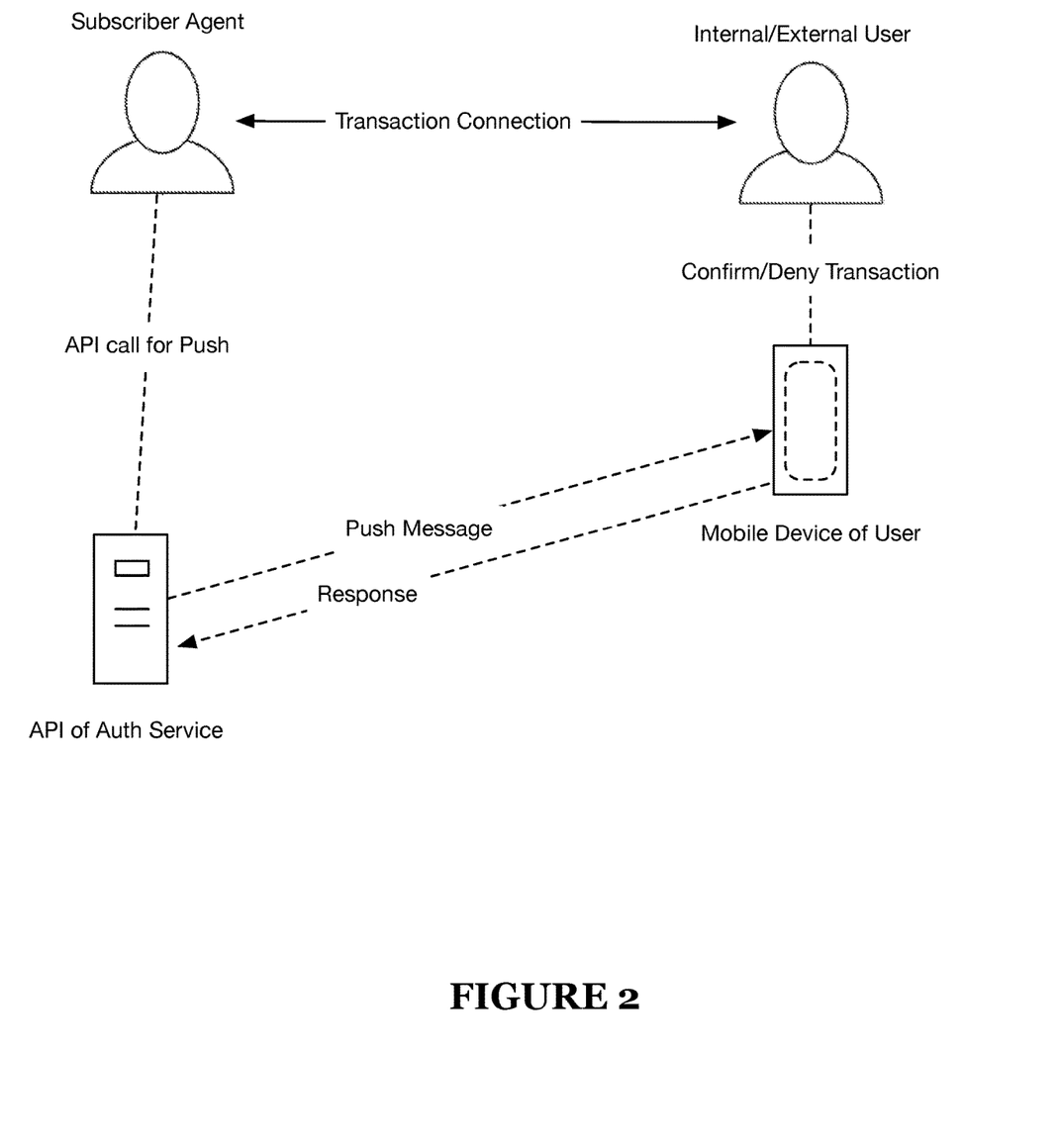
FIG. 2 illustrates a schematic of an example system for implementing the methods described herein in accordance to one or more embodiments of the present application.

As shown in FIG. 2, a system implementing the method 100 preferably includes an agent of an entity subscribed to an authentication service, an internal or external requestor, a confirmation API provided by the authentication service, and one or more devices of the user enrolled with the authentication service. In such system, the requestor may function to make a request for a transaction or the like via a first communication channel with the agent of the subscriber entity. Using the confirmation API, the agent of the subscriber entity may function to locate the requestor and initiate a push-based authentication or confirmation of authorization of the requestor. In such instances, the API may trigger the authentication service to communicate and/or message the enrolled device of the requestor for purposes of receiving a confirmation and/or denial of the transaction request between the requestor and the agent of the subscriber entity.

The method 100 is preferably performed in conjunction with a remote authentication service that provides an application programming interface (API) that enables a subscriber to the authentication service to initiate a push-based authentication and/or authorization request to a mobile communication device of a requestor that is enrolled with the authentication service, as described in U.S. application Ser. No. 13/039,209 and U.S. application Ser. No. 15/146,223, which are both incorporated herein in their entireties by this reference. The authentication service is preferably an internet-accessible server that may be hosted on a distributed computing system but may be hosted on any suitable platform. The initiating agent may typically be an agent of an entity or enterprise (i.e., a subscriber to the authentication service) that is responsible for handling one or more request from internal requestors and/or external requestors for security sensitive operations and/or resources of the entity.

The requested transaction is preferably initiated by the initiating agent through a client such as a website, application, a mobile communication device, a communication application (e.g., a messaging application, or any suitable device capable of achieving a communication connection with the subscriber entity. For authentication, the initiator agent may be a legitimate party or a malicious party attempting to fraudulently impersonate the legitimate party. For authorization, the initiating agent may be a legitimate authenticated party but may require authorization approval to perform the action of the transaction. The authority device is preferably a device associated with an authentic agent that is a user or process that is legitimately authenticated or authorized to execute transactions. Even if a malicious entity were attempting to impersonate a user or authentic agent through stolen credentials or other means, they would—ideally—lack the authority device to complete a transaction because the malicious entity would most likely lack the authority device required for processing additional authentication and/or authorization.

S110, which includes registering an authority device for an account on an authentication service, functions to identify a suitable device of an agent that is permitted to authenticate or authorize transactions and enroll the device with the authentication service. The registration preferably occurs prior to a transaction request and is preferably performed during an initial setup of an account on the authentication service. For example, in the circumstance that the method 100 is implemented with an enterprise subscriber, each employee or agent of the enterprise may be required to enroll a secure device for authenticating the employee or agent (e.g., internal users) for accessing and/or performing security-sensitive transactions (i.e., any transaction determined to need authentication via the authentication service). Additionally, or alternatively, external users (e.g., customers, service providers, etc.) of the enterprise subscriber may similarly be required to enroll or register an authority/authentication device for enabling a provision of a service and/or performing a transaction with the enterprise subscriber.

In a preferred embodiment, Silo may function to enroll an authority device of a (internal/external) user to an account of the subscriber entity that is held and/or maintained by the authentication service. That is, in such embodiments, the subscriber entity may have a preexisting subscription or a subscriber account with the authentication service onto which internal or external users who intend to authenticate with the subscriber may have one or more user devices enrolled to the preexisting subscriber account.

It shall be noted that the method 100 may equally be applicable for authenticating and/or confirming authorization of security-sensitive users (i.e., any user determined to need authentication/authorization via the authentication service). Security-sensitive users may include users of a subscriber entity (as designated by the subscriber entity); in such an implementation, the subscriber entity may communicate such designation to the authentication service in any manner including, but not limited to, via communicating an access policy to the authentication service. For example, the subscriber entity may simply flag any transaction requests related to a security-sensitive user as requiring authentication/authorization verification (without explicitly informing the authentication service that a particular user is security-sensitive). As another example, the subscriber entity may provide a list of security-sensitive users to an authentication service; these users may in turn be linked to specific instances of authenticating apps and/or authority devices. Security-sensitive users may additionally or alternatively include authority agents; that is, security-sensitive users may be specified by the authentication service rather than another entity. For example, a user of an authentication app (of the authentication platform) may be an authority agent for transactions involving several external entities; the authentication app may require authentication/authorization verification for that user for transactions involving all of those external entities if the user is determined to be a security-sensitive user by the authentication service. Security-sensitive users may additionally or alternatively be determined by any entity in any manner.

It shall be noted that the method 100 may equally be applicable for authenticating and/or confirming authorization of a requestor for accessing security-sensitive applications (i.e., any application that requires authentication/authorization via the authentication service). In one or more embodiments, if a transaction related to a security-sensitive application occurs, authenticating and/or confirming authorization of the requestor must occur to complete the transaction. In this example, the method 100 may enable an agent of the subscriber entity to detect that a transaction is associated with a security sensitive application in any manner. The method 100 may enable an agent of the subscriber entity to detect security sensitivity of applications using any technique of U.S. patent application Ser. No. 15/075,687, the entirety of which is incorporated by this reference.

During the setup authentication and/or authorization rules are preferably set. The authority device is preferably a mobile computing (communication) device possessed by an authentic user or an authorized agent. The mobile device is preferably a mobile phone, tablet computer, smartphone, personal data assistant (PDA), personal computer, and/or any suitable computing device. The authority device preferably has access to a network over which communication with the authentication platform is performed, such as a WiFi network, local-area network, telephony network, short message service (SMS) network, multimedia messaging service (MMS), or any suitable network. A plurality of devices may additionally be registered. A second authority device may provide a backup communication point if a primary authority device does not respond. For example, after attempting to contact a primary authority device, the authentication platform may message a secondary authority device for authentication or authorization. Or, alternatively, a threshold of two confirmations may need to be received to authorize a transaction. Additionally, a first authority device may be registered for authenticating the identity of an agent of the transaction request, and a second authority device may be registered for authorizing an action of an agent such that authentication and authorization may both be enabled.

S120, which includes receiving a transaction request from an initiator to a subscriber entity, functions to initiate a (protected) transaction. The transaction is preferably any event, attempt to access a computing resource (e.g., secured data, secured computing elements, etc.), transfer, action, or activity (e.g., involving a subscriber entity) that requires authentication and/or authorization of an involved party (e.g., an authority agent or an initiator, etc.). An exemplary transaction may include an attempt by an employee of a subscriber entity to access a secure data resource or a protected application of the subscriber entity by contacting an information technology (IT) agent of the subscriber entity. In such example, the employee may function to contact the IT agent requesting access to a secure data resource and prior to granting permissions or access to the secure data resource, the IT agent may function to authenticate or confirm authorization for the request by identifying or validating the requestor as a recognized employee and further, initiating a push-based challenge to an enrolled mobile communication device of the employee. Other exemplary transactions may include logging into a website, application or computer system; a user withdrawing money from an ATM; a user initiating a "forgotten password" procedure; a user attempting to enter a restricted area of a building or environment; a payment exchange between two entities; a user attempting to perform a restricted action in a computer system; and/or any suitable application requiring authentication and/or authorization.

Authentication preferably includes validating the identity of at least one involved party relevant to a transaction. Authorization preferably includes validating authority or permission of an entity to execute a transaction. For authentication, the authority device preferably belongs to the authentic user for self-approval of transactions. For authorization, the authority device preferably belongs to an authoritative user (e.g., an authority agent) that is preferably in charge of regulating transactions of a user involved in the transaction. The transactions are preferably initiated in an online environment, where parties may be communicating using a computing device or public/private network, but the transactions may alternatively occur offline where parties may be interacting in the real world. The user or device initiating the transaction is ideally a legitimate party, but in the situations where a malicious party initiates or participates in the transaction, the method 100 is preferably able to properly identify such a situation. After a malicious transaction is prevented the approval rules for a transaction may be dynamically altered to increase security. The transaction is preferably sent from a requesting entity such as a website, application, or device. The requesting entity is typically a system of a subscriber entity in communication with the authentication service. As mentioned previously, an application programming interface (API) or any suitable protocol is preferably used to communicate between the subscriber entity and the authentication service.

In one variation, the communication sent from the subscriber entity is encrypted and the authority device preferably decrypts the information. This variation preferably prevents the authentication service from inspecting or accessing the communicated information which may be applicable when a third party is passing sensitive information through the authentication service. As an alternative variation, the communication between the subscriber entity and the authentication service may preferably be encrypted or otherwise cryptographically protected and communication between the authentication service and the authority device verifies that the communication is from the authority device. Any suitable steps may be taken to secure the communication between the requesting entity, the authentication service and the authority device.

Note that the authority of the authority agent to authorize transactions may be managed in any manner. For example, the authentication service may maintain descriptors of user identity that may be used to link accounts of authority agents with service providers/subscriber entity (e.g., login information of a website) to the authority agent and/or authority device. In this example, when attempting to authenticate or confirm an authorization of a requestor for a transaction, the authentication service may function to expose the descriptors of user identity along with some account data to the subscriber entity via an API. Accordingly, an agent of the subscriber entity may function to manipulate and/or select a descriptor associated with the purported requestor in order to initiate an authentication and/or confirmation of an authorization of the requestor. Additionally, or alternatively, information corresponding to these user identity descriptors may be transmitted by the subscriber entity or other initiator to the authentication service (when requesting authorization). At the authentication service, this information may be used to identify the authority agent or authority device (e.g., a user account at the authentication platform associated with the authority agent, which may be independent of any user account maintained at the service provider).

S130, which includes implementing a confirmation API, may function to provide a confirmation API that enables an agent of the subscriber entity to identify and/or locate a requestor that is enrolled or registered with the authentication service. That is, at the subscriber entity, an agent of the subscriber entity handling a transaction request from a request may function to access a confirmation API provided by the authentication service for purposes of locating users enrolled and/or registered with the authentication service. In a preferred embodiment, the transaction request from the request may include or otherwise, be presented to the subscriber entity with requestor identification data or credentials. In such preferred embodiment, the subscriber entity (or an agent thereof) may function to use the confirmation API of the authentication service and the requestor identification data to locate the requestor.

In some embodiments, the confirmation API of the authentication service may enable the subscriber entity to call a directory of internal users (e.g., employees, agents, contractors, systems, etc.) of the subscriber entity and/or a directory of external users of the subscriber entity and locate (select) the requestor using the directory based on the requestor identification data. In one variation, the confirmation API of the authentication service may enable the subscriber to generate an API call using the requestors identification data that enables the subscriber entity to (automatically) generate a push-based request to an enrolled device of the requestor.

Additionally, or alternatively, once the requestor of the transaction is located and/or selected, S130 may function to enable the subscriber entity to include transaction details with the push-based message prior to initiating an API request to send the push-based message to the enrolled device of the requestor.

It shall also be noted that while in a preferred embodiment, the subscriber entity may use the confirmation API to trigger a push-based confirmation message to an enrolled device of a requestor, other or additional confirmation/authentication schemes may be performed or implemented using the confirmation API including, but not limited to, short messaging service (SMS), electronic mail (e-mail) one-time password (OTP), universal second factor (U2F) authentication token, an automated phone call with authentication data, a chat messaging communication, and/or any suitable electronic communication medium that may be deployed with the confirmation API. That is, the confirmation API may be used to independently or additionally send a confirmation to the enrolled device that includes one or more of the above-mentioned confirmation schemes or any known electronic communication medium. For instance, in the case that an SMS message is triggered using the confirmation API, the SMS messaging may be provided to the enrolled device of the requestor indicating that an action needs to be taken in an authentication service application hosted on the enrolled mobile communication (authority) device of the requestor. In another example, in the circumstance that an OTP is triggered using the confirmation API, the confirmation API may function to generate the OTP and transmit the OTP via SMS, via a security application installed locally on the enrolled device, to a communication medium or channel (e.g., Slack, chat messaging, and/or the like) operating on the enrolled device. In yet another example, in the circumstance that a U2F token is provided, S130 may function to redirect an authenticating user to a web page or the like into which the authenticating user may use or provide the U2F token for authenticating the authenticating user.

S140, which includes messaging the authority device with the transaction request, functions to push a notification or message to an enrolled authority device for authentication or authorization. The messaging of the authority device is preferably initiated by the subscriber entity using the confirmation API. In such preferred implementation, an agent of the subscriber entity may function to locate or select the requestor via the confirmation API and additionally, trigger an initialization or transmission of the push notification using an API call or the like.

A push notification to the enrolled authority device preferably includes a response prompt and is displayed on the enrolled authority device, enabling a user response. Additionally, or alternatively, response to the transaction request may be performed in any manner. The authority device is preferably a device only the authentic user or an authorized user would possess. The message is preferably sent through a communication channel between the authority device and the authentication service. The communication channel is preferably a push notification service provided through the authority device. The communication channel may alternatively be a short message system SMS network, email, an instant message, an in-app notification system, web-based websocket or publication-subscription channels, image based transmission of transaction information such as through QR-codes captured by a camera, or any suitable technique for messaging the device. The messages preferably appear on the authority device or create an alert in substantially real-time (e.g., in less than 5 minutes). The real-time aspect of the messaging functions to enable authentication and authorization at the time of the transaction.

In one variation, tracking a registered authority device may additionally be performed by the authentication service. For example, in a persistent TCP/IP connection model, a mobile device moving from a service provider data network to a WiFi network may change IP addresses and therefore initiate a new persistent connection. Upon receiving that new connection and an identifier of the mobile device, the authentication service preferably updates the state of the device for the account associated with that device. Then, the proper connection is preferably used for messaging the authority device. Some communication channels may have limited throughput and lack the capability to present a full message from the authentication platform. For example, SMS messages have a 160 character limit. An initial message may include a unique identifier, which can then be used to retrieve a full message. For example, the SMS message may include a URL link or code which can be used to retrieve a full message from an application or website. The full message may provide additional information and options for a transaction response. The messages transmitted over the communication channel may additionally be cryptographically signed and encrypted using an established setup between the authentication device and the authentication platform. Additionally, the messages preferably include transaction information (i.e., metadata). The transaction information may include account or entity name, transaction details, location and time of transaction, IP address of initiating host, geolocation of the IP address or any suitable information or any suitable data on the transaction. In one example an online bank transfer may have a message with transaction information including payer, payee, account numbers, transfer amount, and transaction date and time.

S150, which includes receiving an authority agent response from the enrolled authority device to the authentication service, functions to process a response from an authentic user or authorized user. The response preferably confirms or denies a transaction. The confirmation and denial of a transaction may additionally be set to indicate any suitable form of response. Preferably, the initial options are to accept or reject a transaction. Additionally, if a transaction is rejected a reason for rejection may be included such as "canceled because of change of mind" or "possible malevolent transaction". Other variations may include a variety of options that may change based on the application. The available forms of responses may be included in the message information. Other forms of responses may allow a variety of multiple-choice options, variable setting options, or any suitable form of response input. For example, if a manager is acting as an authorization provider for an access request to a sensitive enterprise application made by an internal user (e.g., an employee), a message may be sent to a phone of the manager indicating that the employee is attempting to access a sensitive application. The manager may be able to respond allowing the access to the sensitive application for a restricted or limited period (e.g., access for 10 minutes). As an additional sub-step to receiving an authority agent response, the response is preferably verified to be a legitimate response from the authority device as opposed to an entity imitating the device. Secure Socket Layer (SSL), a Hash-based Message Authentication Code (HMAC), message signing, or any suitable cryptographic protocol may be used to verify the response is from the authority device.

Figure 3:
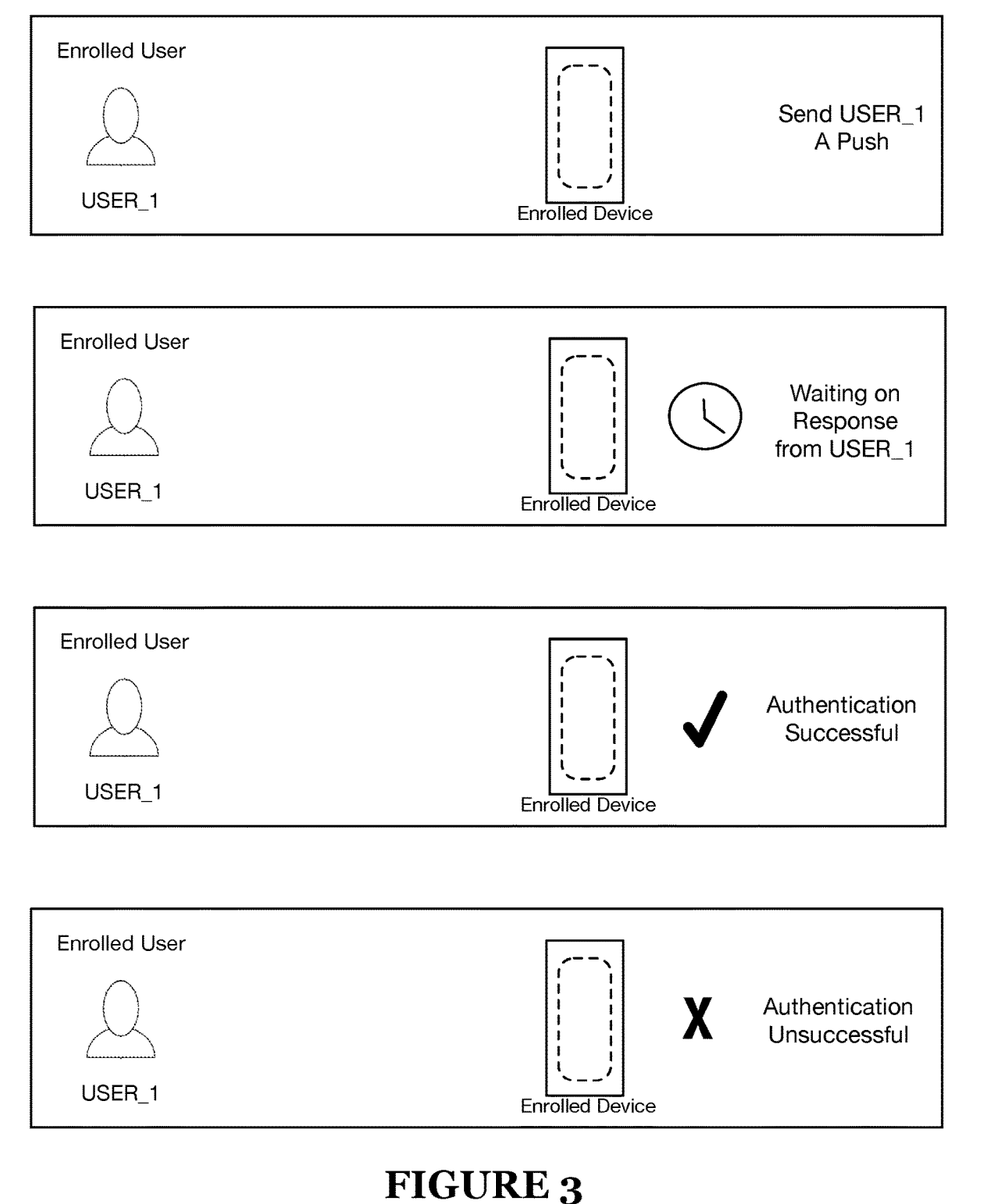
FIG. 3 illustrates an example user interface in accordance with one or more embodiments of the present application.

Additionally, or alternatively, S150 may function to provide a result of a confirmation request (push notification) via a user interface of an administrative panel or the like of an agent of the subscriber entity that initiated the confirmation request. As shown by way of example in FIG. 3, S150 may function to present identification data of the requestor, which may include one or more of an image of the requestor, an internal identification of the request (e.g., employee ID or customer ID, etc.). In some embodiments, the user interface may be the same user interface used by the subscriber entity to initiate the confirmation request to the enrolled device of the requestor and in such instances, the user interface will include a selectable feature for sending the requestor the push notification or message. Additionally, or alternatively, the user interface may include a status of the confirmation or push request (e.g., pending, received at enrolled device, waiting authentication response, processing authentication response, and/or the like). Further, the user interface may display a status indication of whether the authentication of the requestor based on the confirmation request was successful or unsuccessful.

Optionally, S160 and S162, which include if the authority agent response confirms the transaction, communicating a confirmed transaction to the initiator, and if the authority agent response denies the transaction, communicating a denied transaction to the requestor, function to communicate the authentication and/or authorization to the requestor of the transaction. Any suitable response to a transaction is preferably communicated back to the subscriber entity. The subscriber entity can then preferably take appropriate action. If the transaction is confirmed or approved, the transaction proceeds. If the transaction is denied or altered, the subscriber entity preferably halts or prevents the transaction. The subscriber entity can preferably use the transaction response to modify a transaction state in any suitable manner. Based on the variety of responses from authentic users and/or authorized users, rules may determine when to confirm or deny a transaction. In a variation of the method, there may be a plurality of authority devices registered for authorization and/or authentication. A rule may be setup for which authority devices to message, in what order, and the timing of the messaging. Additionally, rules may be set for received responses. A particular threshold for the number of responses from the plurality of authority devices may be set. For example, four authority devices may be messaged for authorization and at least three must confirm the transaction for it to be confirmed. In another example, a plurality of authority devices for authentication may be registered, and the authority devices are messaged one after the other until at least one responds. The response from an authority agent may alternatively be passed on to the requesting entity with no analysis.

Alternative embodiments may implement the above methods in a computer-readable medium storing computer-readable instructions. The instructions are preferably executed by computer-executable components preferably integrated with an authentication platform. The authentication platform is preferably hosted on a distributed computing system or cloud based platform but may alternatively be hosted in any suitable system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The authentication platform preferably includes an API for third party services and devices to use in initiating transactions and interpreting responses from the authentication platform. The platform preferably includes a communication channel such as a public or private network or SMS network to communicate with at least one authority device. The authority device is preferably a mobile phone but may be any suitable personal computing device.

As a person skilled in the art will recognize from the previous detailed description and from the figures and claims, modifications and changes can be made to the preferred embodiments of the invention without departing from the scope of this invention defined in the following claims.

We claim:

1. A method for implementing an application programming interface for a multi-factor authentication service, the method comprising:
   at a subscriber entity:
      receiving, from a requestor, an access request to one or more services or to one or more resources of the subscriber entity, wherein the subscriber entity relates to an entity having a subscriber account with a remote security service, wherein the subscriber account subscribes the subscriber entity to one or more security services of the remote security service;
      transmitting a user validation request via a validation application programming interface (API) of the remote security service based on the access request;
      identifying the requestor via the validation API, wherein the identifying includes:
      searching the requestor via the validation API based on identification data of the requestor, wherein the identification data comprises one or more of an image of the requestor, and an employee or customer identification of the requestor, and
      selecting the requestor from search results of the validation API, wherein transmitting the user validation request via the validation API is based on the selecting of the requestor;
   at the validation API of the remote security service:
      identifying: (i) the subscriber account of the subscriber entity and (ii) an enrolled user device of a user enrolled with the subscriber account based on the user validation request;
      identifying an authentication scheme from a plurality of distinct authentication schemes based on the user validation request, wherein the authentication scheme is selected by the subscriber entity via the validation API, and wherein the authentication scheme indicates one distinct authentication method selected from a plurality of distinct authentication methods for authenticating the requestor;
      transmitting to the enrolled user device an authentication request based on the authentication scheme;
      collecting from the enrolled user device a response to the authentication request and presenting a validation response to the authentication request to the subscriber entity based on the response; and
   granting or denying the access request of the requestor based on the validation response from the validation API of the remote security service.

2. The method according to claim 1, wherein:
   the enrolled user device of the user includes a security application of the remote security service installed locally on the enrolled user device of the user, and
   the authentication scheme includes pushing the authentication request, via the API, to the security application of the enrolled user device of the user.

3. The method according to claim 1, wherein
   the authentication scheme includes transmitting from the API the authentication request in a short message service message to the enrolled user device of the user.

4. The method according to claim 1, wherein
   the authentication scheme includes (a) generating a one-time password (OTP) by the API and transmitting from the API the authentication request comprising the OTP to the enrolled user device of the user.

5. The method according to claim 1, wherein
   the authentication scheme includes (a) generating a universal second factor (U2F) token by the API and transmitting from the API the authentication request comprising the U2F token to the enrolled user device of the user.

6. The method according to claim 1, wherein:
the multi-factor authentication service maintains a list of users having one or more enrolled user devices with the subscriber account, and
the list of users is exposed via the validation API based on an initiation of the user validation request by the subscriber entity.

7. The method according to claim 1, wherein:
the multi-factor authentication service maintains a list of users having one or more enrolled user devices with the subscriber account, and
the list of users is exposed via the validation application programming interface based on the searching the requestor via the validation API.

8. The method according to claim 1, wherein
presenting the validation response to the authentication request to the subscribing entity includes presenting the validation response via the validation API,
the validation response indicating a successful authentication or an unsuccessful authentication of the user.

9. The method according to claim 1, wherein
the requestor relates to an internal requestor that includes an agent of the subscriber entity.

10. The method according to claim 1, wherein
the requestor relates to an external requestor that includes a non-agent of the subscriber entity, and
the external requestor enrolls a user device to the subscriber account at the remote security service based on scanning with the user device a computer-readable code that automatically enrolls the user device that scans the computer-readable code to the subscriber account.

11. The method according to claim 1, further comprising:
at the subscriber entity:
implementing a web-based interface that exposes the validation API of the remote security service.

12. The method according to claim 1, wherein
the remote security service is implemented by a distributed network of computers including the validation API.

13. The method according to claim 1, wherein
the validation response comprises an indication computed by the remote security service indicating that a validation of the requestor is successful based on the response to the authentication request.

14. The method according to claim 1, wherein
the validation response comprises an indication computed by the remote security service indicating that a validation of the requestor is unsuccessful based on the response to the authentication request.

15. A method of implementing an application programming interface of an authentication service for authenticating internal users or external users to a subscriber of the authentication service, the method comprising:
implementing a confirmation application programming interface (API) that is in operable communication with API endpoints of a remote authentication service, wherein the implementing includes:
initiating a confirmation API request based on receiving an access request at a subscriber to the remote authentication service, wherein the confirmation API request operates to perform an authentication of a requestor making the access request by providing a user validation request from the subscriber to the confirmation API;
identifying the requestor based on a search of the requestor via the confirmation API, wherein the identifying includes:
searching the requestor via the confirmation API based on identification data of the requestor, wherein the identification data comprises one or more of an image of the requestor, and an employee or customer identification of the requestor, and
selecting the requestor from search results of the confirmation API;
identifying, by one or more API endpoints of the remote authentication service: (i) a subscriber account of the subscriber maintained by the remote authentication service and (ii) identifying a user device of the requestor that is enrolled with the subscriber account based on the confirmation API request;
identifying an authentication scheme from a plurality of distinct authentication schemes based on the user validation request, wherein the authentication scheme is selected by the subscriber via the confirmation API, and wherein the authentication scheme indicates one distinct authentication method selected from a plurality of distinct authentication methods for authenticating the requestor;
transmitting a confirmation request, by the one or more API endpoints of the remote authentication service, to the user device that is enrolled with the subscriber account, wherein transmitting the confirmation request via the confirmation API is based on the selecting of the requestor;
obtaining from the user device a response to the confirmation request and presenting the response to the confirmation request to the subscriber; and
granting or denying the access request based on the response from the confirmation API of the remote authentication service.

16. The method of claim 1, wherein the requestor has a first user account associated with the multi-factor authentication service that is independent of a second user account that is associated with the one or more services or the one or more resources.

17. The method of claim 15, wherein the requestor has a first user account associated with the authentication service that is independent of a second user account that is associated with one or more services or one or more resources to which the access request is placed.

* * * * *